(12) United States Patent
Bhagat (10) Patent No.: US 9,098,569 B1
(45) Date of Patent: Aug. 4, 2015

(54) GENERATING SUGGESTED SEARCH QUERIES

(75) Inventor: Rahul H. Bhagat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 12/965,476

(22) Filed: Dec. 10, 2010

(51) Int. Cl.
*G06F 7/00* (2006.01)
*G06F 17/30* (2006.01)
*G06Q 30/02* (2012.01)

(52) U.S. Cl.
CPC ...... *G06F 17/30646* (2013.01); *G06Q 30/0256* (2013.01); *Y10S 707/99932* (2013.01)

(58) Field of Classification Search
CPC .............. G06F 17/30864; G06F 17/30737; G06F 17/30867; G06F 17/30672; G06F 17/2795; G06F 17/3097; G06F 17/30646; Y10S 707/99935; Y10S 707/99932; Y10S 707/99934
See application file for complete search history.

(56) References Cited

U.S. PATENT DOCUMENTS

| | | | | |
|---|---|---|---|---|
| 6,006,225 | A * | 12/1999 | Bowman et al. ............. | 1/1 |
| 6,144,958 | A * | 11/2000 | Ortega et al. ............... | 1/1 |
| 6,578,022 | B1 * | 6/2003 | Foulger et al. ............. | 706/45 |
| 6,643,640 | B1 * | 11/2003 | Getchius et al. ........... | 707/719 |
| 6,772,150 | B1 * | 8/2004 | Whitman et al. ........... | 707/721 |
| 6,853,993 | B2 * | 2/2005 | Ortega et al. .............. | 1/1 |
| 7,493,304 | B2 * | 2/2009 | Day et al. .................. | 1/1 |
| 7,499,940 | B1 * | 3/2009 | Gibbs ....................... | 1/1 |
| 7,873,622 | B1 * | 1/2011 | Karls et al. ................. | 707/707 |
| 7,953,746 | B1 * | 5/2011 | Garg et al. ................. | 707/762 |
| 8,055,669 | B1 * | 11/2011 | Singhal et al. ............. | 707/765 |
| 8,140,556 | B2 * | 3/2012 | Rao et al. .................. | 707/759 |
| 8,620,915 | B1 * | 12/2013 | Brukman et al. ........... | 707/733 |
| 8,756,220 | B1 * | 6/2014 | Provine et al. ............. | 707/721 |
| 2004/0194141 | A1 * | 9/2004 | Sanders ..................... | 725/53 |
| 2004/0210560 | A1 * | 10/2004 | Shuster ...................... | 707/3 |
| 2005/0246332 | A1 * | 11/2005 | Wang et al. ................ | 707/3 |
| 2006/0106769 | A1 * | 5/2006 | Gibbs ......................... | 707/3 |
| 2006/0161534 | A1 * | 7/2006 | Carson et al. .............. | 707/3 |
| 2006/0224587 | A1 * | 10/2006 | Zamir et al. ............... | 707/7 |
| 2006/0224615 | A1 * | 10/2006 | Korn et al. ................. | 707/102 |
| 2006/0253427 | A1 * | 11/2006 | Wu et al. ................... | 707/3 |
| 2007/0027864 | A1 * | 2/2007 | Collins et al. ............. | 707/5 |
| 2007/0038614 | A1 * | 2/2007 | Guha .......................... | 707/4 |
| 2007/0038615 | A1 * | 2/2007 | Vadon et al. .............. | 707/4 |
| 2007/0162422 | A1 * | 7/2007 | Djabarov .................... | 707/2 |
| 2007/0214131 | A1 * | 9/2007 | Cucerzan et al. .......... | 707/5 |
| 2007/0294615 | A1 * | 12/2007 | Sathe ......................... | 715/517 |
| 2008/0010316 | A1 * | 1/2008 | Liao et al. ................. | 707/104.1 |
| 2008/0077570 | A1 * | 3/2008 | Tang et al. ................ | 707/5 |
| 2008/0120072 | A1 * | 5/2008 | Bartz et al. ................ | 703/2 |
| 2008/0140643 | A1 * | 6/2008 | Ismalon ..................... | 707/5 |
| 2008/0140699 | A1 * | 6/2008 | Jones et al. ............... | 707/102 |
| 2008/0154877 | A1 * | 6/2008 | Joshi et al. ................ | 707/5 |
| 2008/0228750 | A1 * | 9/2008 | Zaragoza .................... | 707/5 |
| 2008/0243821 | A1 * | 10/2008 | Delli Santi et al. ........ | 707/5 |
| 2008/0256035 | A1 * | 10/2008 | Zhang et al. .............. | 707/3 |

(Continued)

FOREIGN PATENT DOCUMENTS

WO    WO 0142880 A2 *  6/2001

*Primary Examiner* — Augustine K Obisesan
(74) *Attorney, Agent, or Firm* — Thomas | Horstemeyer, LLP (57) ABSTRACT

A user supplied search query is received. Historical search queries are identified that are relevant and/or similar to the user supplied search query. The identified historical queries are then ranked according to various factors. Suggested search queries that are relevant to the user supplied query are identified.

22 Claims, 5 Drawing Sheets

(56) References Cited

U.S. PATENT DOCUMENTS

| | | | |
|---|---|---|---|
| 2009/0012778 A1* | 1/2009 | Feng et al. | 704/9 |
| 2009/0019002 A1* | 1/2009 | Boulis | 707/3 |
| 2009/0106219 A1* | 4/2009 | Belknap et al. | 707/4 |
| 2009/0132529 A1* | 5/2009 | Gibbs | 707/5 |
| 2009/0144262 A1* | 6/2009 | White et al. | 707/5 |
| 2009/0299991 A1* | 12/2009 | Zarzar Charur et al. | 707/5 |
| 2010/0082649 A1* | 4/2010 | Gutt et al. | 707/758 |
| 2010/0083029 A1* | 4/2010 | Erickson et al. | 714/2 |
| 2010/0094835 A1* | 4/2010 | Lu et al. | 707/705 |
| 2010/0153428 A1* | 6/2010 | Schechter et al. | 707/768 |
| 2010/0153440 A1* | 6/2010 | Hubert | 707/769 |
| 2010/0161643 A1* | 6/2010 | Gionis et al. | 707/765 |
| 2010/0174710 A1* | 7/2010 | Carson et al. | 707/728 |
| 2010/0185644 A1* | 7/2010 | Gutt et al. | 707/759 |
| 2010/0262615 A1* | 10/2010 | Oztekin et al. | 707/768 |
| 2010/0325133 A1* | 12/2010 | Rounthwaite et al. | 707/759 |
| 2011/0225155 A1* | 9/2011 | Roulland et al. | 707/737 |
| 2011/0258212 A1* | 10/2011 | Lu et al. | 707/760 |
| 2012/0117102 A1* | 5/2012 | Meyerzon et al. | 707/767 |

\* cited by examiner

GENERATING SUGGESTED SEARCH QUERIES

BACKGROUND

Search systems can be employed in various settings, including in a general purpose setting or in an electronic commerce system. Search systems can surface various items in a data store based on keyword matching, relevance, similarity, and other measures. Some search queries submitted by users may not surface any items in a data store regardless of the matching. In an electronic commerce system, additional information is known about search results (e.g., products in a catalog) in a data store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein related to generating suggested search terms that can be employed to locate one or more items in a data store. In some embodiments, the suggested search terms can be employed to locate products in an electronic commerce system. During the interactions of a user with an electronic commerce system, for example, search queries submitted by a user to a search engine may yield few and/or no search results. In some scenarios, search queries submitted by a user may yield search results that do not result in a high rate of conversion, or product purchases. Other scenarios can be appreciated in which it may be desired to provide higher quality search results to a user of an electronic commerce system. Accordingly, embodiments of the disclosure described herein relate to systems and methods of generating suggested queries based at least upon historical search queries submitted by other users as well as various metrics and other data about the historical search queries that are housed in a data store.

Figure 1:
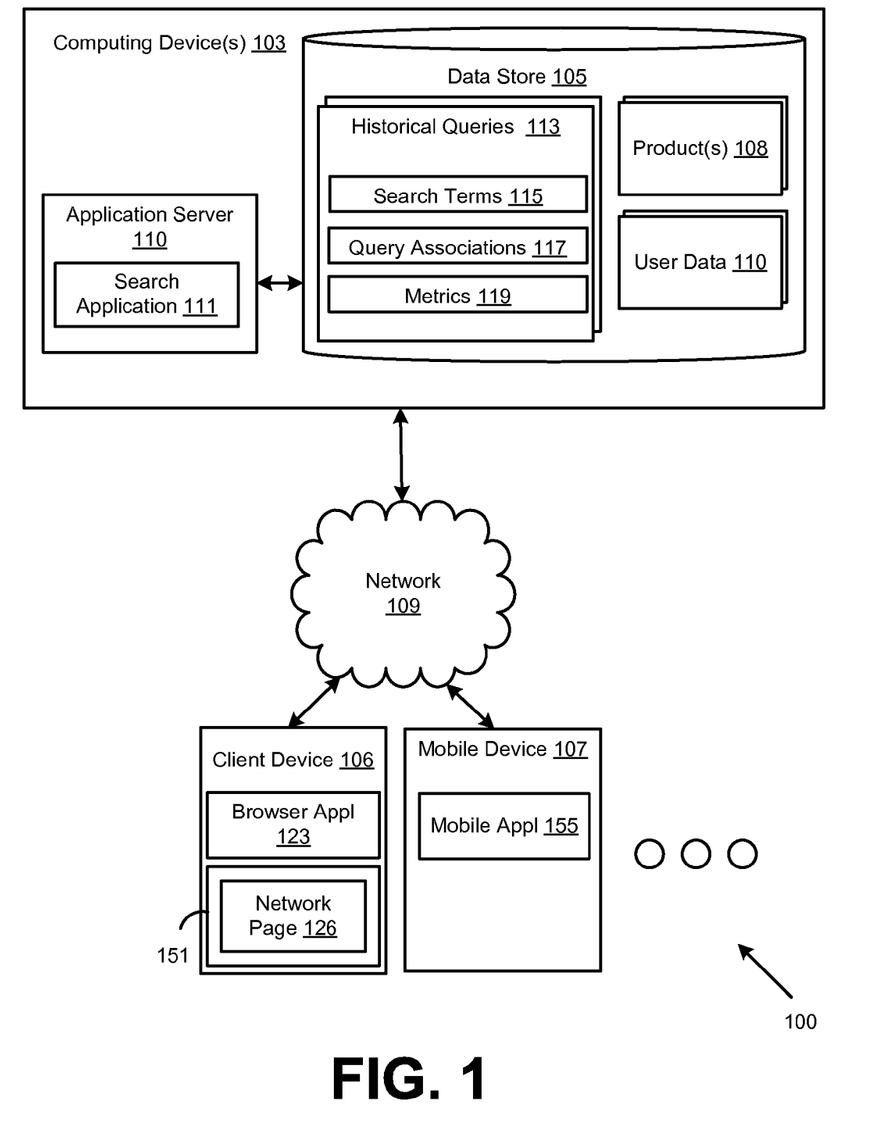
FIG. 1 is a drawing of a networked environment including a computing device executing a search application according to an embodiment of the present disclosure.

With reference to FIG. 1, shown is a networked environment 100 according to various embodiments. The networked environment 100 includes at least one computing device 103, a data store 105, and at least one client 106 in communication with the computing device 103 via a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data and/or items are stored in a data store 105 that is accessible to the computing device 103. The data store 105 may be representative of a plurality of data stores that can be geographically disparate and accessible to the computing device 103 via a network 109, as can be appreciated. As a non-limiting example, applications facilitating embodiments of this disclosure can be executed on the computing device 103, and other devices dedicated to providing the functionality of a data store 105 or data store can be located in a separate installation accessible to the computing device 103. Additionally, the items and/or data stored in the data store 105, for example, are associated with the operation of the various applications and/or functional entities described below.

The data store 105, in the non-limiting example of an electronic commerce system facilitated by the computing device 103, can include items that are associated with products 108 available in the electronic commerce system. The data store 105 can also include other data relevant to products, such as, but not limited to, the following: product category, title, keywords, description, price, weight, shipping methods, related images, reviews, similar items, meta data, hidden text, a list of merchants selling the item, stock number, other associated categories, page view history, etc. The data store 105 can also include other data related to products 108 as can be appreciated, but are not necessary to discuss herein for an understanding of the various embodiments of the disclosure. Additionally, in the case of a computing device 103 facilitating a content delivery system other than an electronic commerce system (e.g., a general purpose search engine, etc.), the data store 105 can store other data associated with items for which the content delivery system is suited.

The data store 105 can also include information about users of the system. User data 110 can include a user profile associated with the various users of, for example, an electronic commerce system facilitated by the computing device 103. Such a user profile can include data about the user, browsing history, purchase history, product interests, demographic information, location, a product wish list, etc. Additionally, user data 110 can store information about various user sessions that describe the interactions of a user with the computing device 103. By way of illustration, purchase history in a user profile can identify each of the purchases made by users via an electronic commerce system. As another example, browse history data sets forth the browsing activity of customers when they visit an electronic commerce system. The browse history data can include data indicating how a user has navigated through an electronic commerce system and the products or communities in which a user has viewed and/or expressed an interest.

The data store 105 can also include data about historical search queries 113. Historical search queries 113 can include search queries submitted by users in the past that have yielded search results. Accordingly, query terms 115 that describe the search terms associated with the historical query 115. Query associations 117 can also be stored in the data store 105 for each historical search query 113. A query association 117 can include meta data associated with the historical search query 113 that can be used to determine relevance and/or similarity to a search query submitted by a user to the search application 111, as will be described in further detail herein. One example of a query association 117 can be a geographic location associated with the users who have submitted the historical search query 113 in the past. Another non-limiting example of a query association 117 can include a product category or marketplace within an electronic commerce system in which the historical search query 113 was submitted by a user. In some embodiments, a query association 117 can include another search query with which a particular search query should be associated. As one example, the search application 111 may determine that a percentage of users above a predefined threshold have entered two different queries in a single session. Accordingly, the search application 111 can designate these two queries as related. Therefore, a historical search query entry 113 associated with these queries can have a query association 117 that points to the other.

Historical search queries can also be associated with various other metrics 119, which can be stored in the data store 105. Metrics 119 associated with a historical query can include a number of search results with which the query is associated, a popularity of the historical search query, a conversion rate associated with the query, and other metrics as can be appreciated. In one embodiment, a conversion rate associated with a historical query can be based at least upon a percentage of users in an electronic commerce system that purchase a product that is a search result associated with the historical query.

Various other behavioral data can also be stored as metrics 119 associated with the query. In some embodiments, the search application 111 or other application can track user behavior in a session, relate this behavior to search terms entered by the user during the session, and store the data as a metric 119. As one example, the search application 111 can track an amount of time a user spends browsing search results after a search query is submitted to the search application 111 and search results returned to the user. In one example, if a user spends more time browsing search results relative to other search queries, it may be deduced that the search query returned relevant results that held the user's attention. As another example, the search application 111 can track whether a user adds a search result that is a product to a virtual shopping cart in an electronic commerce system. The search application 111 can deduce from this behavior that the search query provided relevant search results.

The computing device 103 is configured to execute various applications such as, for example, an application server 110 and a search application 111, and potentially other applications. In one embodiment, an application server 110 is executed to provide for interaction between the applications on the computing device 103 and clients 106 and/or mobile devices 107 as will be described. To this end, the application server 110 may also include, for example, a web server application or similar application as can be appreciated. Other systems and/or applications facilitated or executed by an application server 110 may also include, but are not limited to, order fulfillment systems, dynamic network or web page servers, inventory systems, or other systems as can be appreciated. However, such systems are not described herein in detail.

Users of the search application 111, whether in the context of an electronic commerce system, a general purpose search engine, or other system, may attempt to use search terms or search phrases to locate one or more items in the data store 105. In the depicted non-limiting embodiment, users of the search application 111 may submit search queries to the search application 111 to attempt to locate products available via an electronic commerce system facilitated by the computing device 103.

The client 106 and mobile device 107 are representative of a plurality of devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 123 and/or other applications. The browser 123 may be executed in a client 106, for example, to access and render network pages 126, such as web pages, or other content served up by the computing device 103 and/or other servers. The client 106 may be configured to execute applications beyond a browser 123 such as, for example, email applications, instant message applications, and/or other applications. Accordingly, in some embodiments a user can manipulate a user interface presented in the form of network pages 126 shown on a display device 151 via the browser 123 or other application that causes interaction with the application server 110 executed by the computing device 103. The application server 110 executed on the computing device 103 can facilitate the generation of user interfaces on a client 106 by transmitting data to the client 106 that can be rendered by a browser 123 or other application to create the various user interfaces.

Another example of a device that can interact with the search application 111 includes a mobile device 107, which can execute a mobile application 155 such as a browser that can render network pages generated by the search application 111. In another embodiment, the mobile application 155 can be tailored to access data provided by the search application 111 and can include client side code that generates a user interface on a display device of the mobile device 107. Accordingly, a user can submit questions to the search application 111 as well as browse and/or submit responses to questions published by the search application 111 via the mobile application 155. The mobile device 107 may comprise a mobile device including cellular telephone and data access, location detection hardware, and other hardware and software components. The mobile device 107 can detect the location of a user using global positioning system (GPS) or other location detection functionality, which can be submitted by the mobile application 155 to the search application 111. In one example, global positioning system (GPS) functionality provided by the mobile device 107 can provide a location of the client to the mobile application 155, which can in turn transmit a location of the client to the search application 111. In one embodiment, the search application 111 can utilize location based services and applications executed on the mobile device 107 to determine a location of the user, which can, in some embodiments, be employed to assist with generating suggested search queries.

It should also be appreciated that a client of the search application 111 can be another software module that facilitates communication with a client 106 or mobile device 107. As one example, the search application 111 can provide an application programming interface (API) through which another software application can access the functionality of the search application 111. In one embodiment, a presentation layer module may interact with the search application 111 by submitting a search request to a search application 111 API, which can respond with a search response that includes various search results. Other variations should be appreciated by a person of ordinary skill in the art.

Therefore, in the context of the non-limiting exemplary framework presented above, in order to facilitate embodiments of the present disclosure, the search application 111 is executed to collect and process information relating to user search queries regarding related products, product categories, and/or other data accessible to the computing device 103. To this end, the search application 111 can facilitate the generating of a search term user interface element that allows a user to submit search terms for items the user wishes the locate in the data store 105. In addition, the search application 111 can provide suggested search terms to a user based at least upon characters entered in a search term user interface provided by the search application 111 on a client or mobile device.

The search application 111 can employ various algorithms that take into account various factors and data to generate search query suggestions in response to a search query received from a client. Additionally, there are numerous practical applications of the generating of suggested search queries, as will be described herein. In one embodiment, upon receiving a search query from a client or mobile device, the search application 111 can determine whether the search query is associated with any search results in the data store 105. In the case of an electronic commerce system facilitated by the at least one computing device 103, the search application 111 can determine whether the search query is associated with any products 147 in the data store 105. As can be appreciated, to make such a determination, the search application 111 can execute a similarity and/or relevance algorithm against a search index that indexes various data regarding the products 147.

If, in the above example, there are no products associated with the search query in the data store 105, the search application 111 can identify whether there are historical search queries 113 that are relevant and/or similar to the search query that are associated with search results and/or products in the data store 105. If there are historical search queries 113 that are relevant and/or similar to the search query, the search application 111 can generate a user interface, such as a network page, that includes one or more of these historical search queries 113 as well as one or more of their associated search results.

In one embodiment of this disclosure, in order to identify similar and/or relevant historical search queries, the search application 111 can determine if there are historical search queries 113 that are associated with search results in the data store 105 by removing one or more search term from the search query. The search application 111 can examine the various permutations of resultant queries that result from the removal of search terms from the search query and determine if they match search terms of a historical search query 113 that is associated with search results. If the resultant search queries are associated with search results, they can be identified as potentially similar and/or relevant historical search queries 113 relative to the original search query. The search application 111 can then rank the historical search queries 113 according to a number of search results associated therewith. As one example, a historical search query 113 so identified that is associated with the most search results can be designated as the highest ranked historical search query 113 relative to the user supplied search query.

In some embodiments, as described above, the search application 111 can remove search terms from a user supplied search query until an exact match is found as a historical search query 113 that is associated with search results in the data store. In one embodiment of such a function, the search application 111 can be limited to only remove one search term from the user supplied search query. For example, if a user supplied four term search query that yields no products when a search of the data store is executed using the search query, the search application 111 can determine whether there are three term historical search queries 113 using any three of the four terms that are associated with at least one search result. In this way, the likelihood that search application 111 yields search results that are not relevant to the search query is reduced.

In another embodiment, the search application 111 can identify historical queries similar and/or relevant historical search queries 113 by calculating a phrase level edit distance of the search query relative to historical search queries 113. A phrase level edit distance as can be implemented in embodiments of the disclosure by determining a number of phrase or word substitutions, or word additions and/or deletions, required to transform a search query submitted by a user into a historical query 113 in the data store 105. Accordingly, a historical query requiring the fewest number of word substitutions to arrive at the search query entered by a user can be ranked as the most similar and/or relevant historical search query.

The search application 111 can also identify relevant and/or similar historical search queries in the data store 105 by performing various text similarity functions. The search application 111 can determine relevance and/or similarity by calculating a cosine similarity, jaccad similarity, dice similarity, and other textual similarity functions as can be appreciated. Accordingly, in the case of a search query submitted by a user that yields no search results, the search application 111 can employ one or more textual similarity functions to identify the most similar historical search query 113 that is associated with a search result, and generate a user interface with one or more of the most similar historical search queries 113.

The search application 111 can also identify the importance of words in a user supplied search query and assign a weight to each of the words according to its importance. Accordingly, the search application 111 can then identify a similar and/or relevant historical search query 113 using a vector based similarity function. In one embodiment, in the case of a multi-word user supplied search query, the search application 111 can determine whether the individual words in the search query constitute a historical query 113 in the data store 105 that is associated with one or more search results. The search application 111 can then assign a higher weight to a word in the search query that is associated with a fewer number of search results greater than one. In this way, common words that may be associated with a large number of search results are weighted less, as it can be deduced that those search terms that are associated with fewer search results are more likely to yield a search result that is relevant to the user supplied search query.

The search application 111 can also rank the identified historical search queries 113 in various other ways independent of textual similarity that can facilitate the identification of a historical search query 113 that can be provided to a user, particularly in the case of a user supplied search query that yields no search results. As described above, historical search queries 113 that are identified as relevant and/or similar to a user supplied search query can be ranked according to a number of search results with which they are associated. Historical search queries 113 that are identified by the search application 111 can also be ranked according to a conversion rate of the historical search query. In other words, the search application 111 can rank a historical search query 113 in an electronic commerce system that yields in the highest number of purchases, profits, revenue, or other metrics.

Historical search queries 113 that are identified by the search application 111 can also be ranked by popularity. In other words, the search application 111 can rank a historical search query 113 submitted by the number of users who submitted the query, the number of times the query was executed, or other aggregate metrics. Historical search queries 113 that are identified by the search application 111 can also be ranked according to their query associations 117. For example, if a user supplied search query is submitted with a filter, the search application 111 can rank a historical search query 113 associated with the same filter higher than other historical search queries. In the case of an electronic commerce system facilitating multiple marketplaces as well as multiple product categories, one example of a filter can be the marketplace and/or product category filter supplied by the user when submitting the search query.

The search application 111 can identify relevant and/or similar historical search queries 113 relative to a user supplied search query by applying one of the above methods. Additionally, the search application 111 can also apply any combination of the above factors and weight the factors in various ways. As one example, the search application 111 can identify relevant historical queries by removing search terms until an exact match of a historical query yielding search results is found. As noted above, because the search application 111 can perform such a process on the various permutations of queries that would result from removing one search term from a multi-term search query, this may result in multiple historical search queries that yield search results. Accordingly, in one example, the search application 111 can generate a ranking of the historical search queries according to popularity, conversion rate, a marketplace association, and any other factor as can be appreciated.

Additionally, the search application 111 can restrict the historical search queries 113 that are analyzed to a particular time period. As one non-limiting example, the search application 111 can analyze historical search queries 113 in the data store 105 that were submitted by other users in the thirty days previous to the time the user supplied search query is received.

Figure 2:
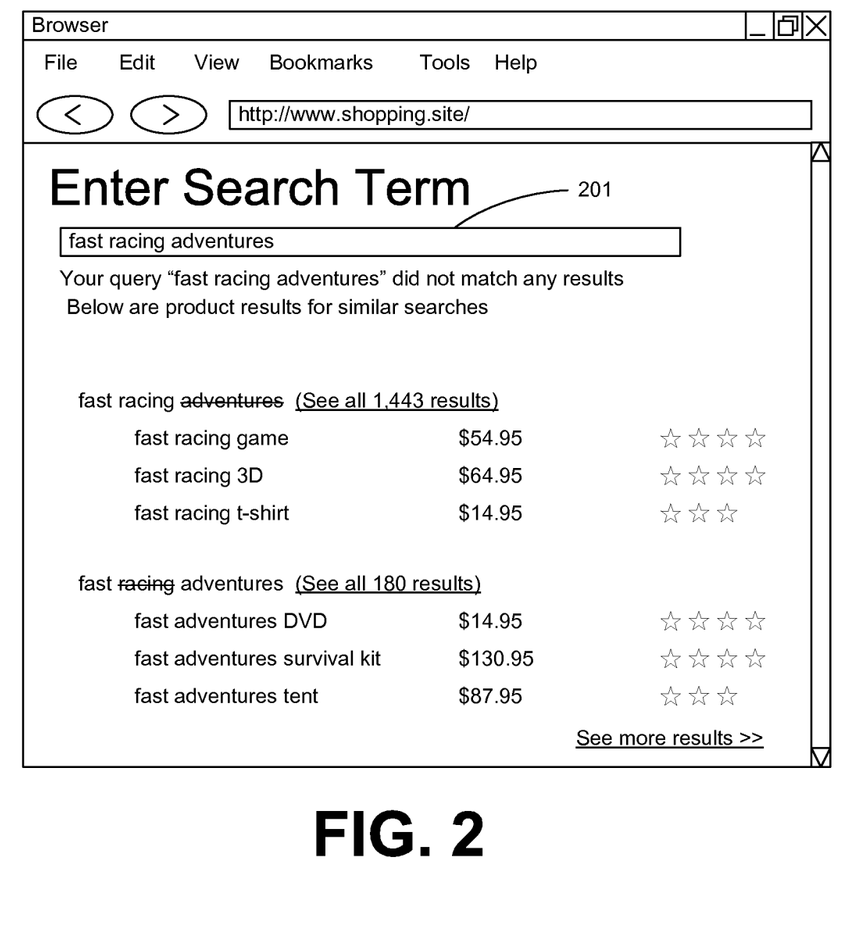
FIG. 2 is a drawing of a user interface generated by the computing device of FIG. 1 according to an embodiment of the present disclosure.

Having described various ways that historical search queries 113 that are similar and/or relevant to a user supplied search query can be identified, reference is now made to FIG. 2, which depicts a user interface that can be facilitated by the search application 111 in various embodiments of the disclosure. The user interfaces shown in FIGS. 2-4 can be generated by the search application 111 or other software module in association with the search application 111. As one non-limiting example, a presentation layer can generate a network page in a presentation language and encodes for display search results and other data regarding search queries generated by the search application 111.

The non-limiting user interface example shown in FIG. 2 shows one application of the way in which historical search queries 113 identified by the search application 111 can be employed to generate search results for a user. In the depicted example, a search query received by the search application in a search term user interface element 201 yields no search results. In the context of an electronic commerce system facilitated by a computing device 103 executing the search application 111, the search query is not associated with any products available via the electronic commerce system.

Accordingly, in response to a search query that does not yield any product search results, the search application can identify similar and/or relevant historical search queries 113 in a data store 105. In the depicted example, the search application removes a search term from the user supplied search query, and determines whether the various permutations of the resultant query are stored in the data store 105 as a historical search query 113 that is in turn associated with product search results. In FIG. 2, the search application also ranks the historical queries according to a number of product search results with which the historical search query 113 is associated. Accordingly, the search application 111 facilitates generation of a user interface that includes the historical search queries 113 displayed in a ranked order according to the number of product search results with which they are associated. The search application 111 can also facilitate generation of a user interface that displays a subset of search results with each of the historical queries 113 identified by the search application 111.

Figure 3:
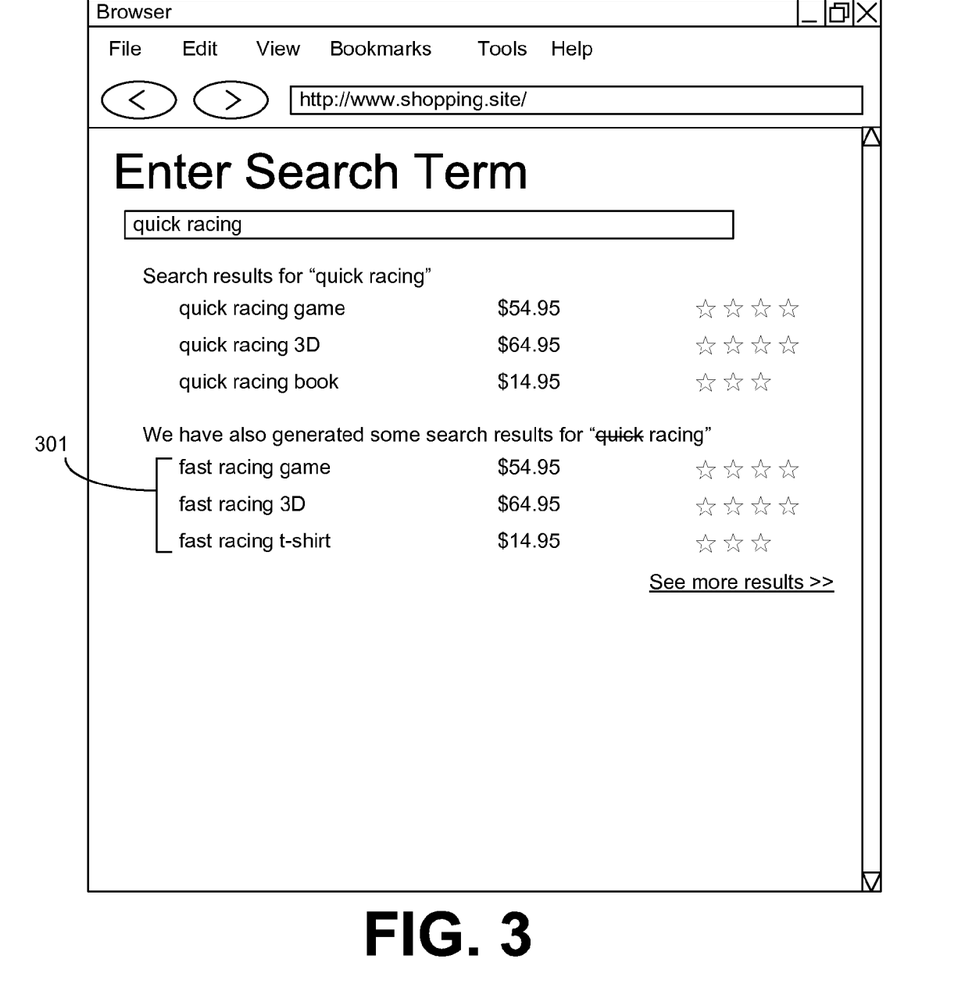
FIG. 3 is a drawing of a user interface generated by the computing device of FIG. 1 according to an embodiment of the present disclosure.

Reference is now made to FIG. 3, which depicts an alternative example of a user interface facilitated by the search application 111. In FIG. 3, a user supplied query is associated with a number of search results, and the search application 111 can identify historical search queries 113 that are relevant and/or similar to the user supplied search query to supplement the user interface with additional search results 301. In the depicted example, the search application 111 identifies related historical search queries 113 by removing a search term from the user supplied search query and determining whether the resultant query corresponds to a historical search query 113. In the depicted example, the search application 111 can facilitate generation of a user interface that displays search results corresponding to the highest ranked historical search queries 113. As described above, a historical search query 113 that is related to a user supplied search query can be ranked according to various factors, such as, popularity, conversion rate of associated search results, profitability of a product search result, and other factors as can be appreciated.

Figure 4:
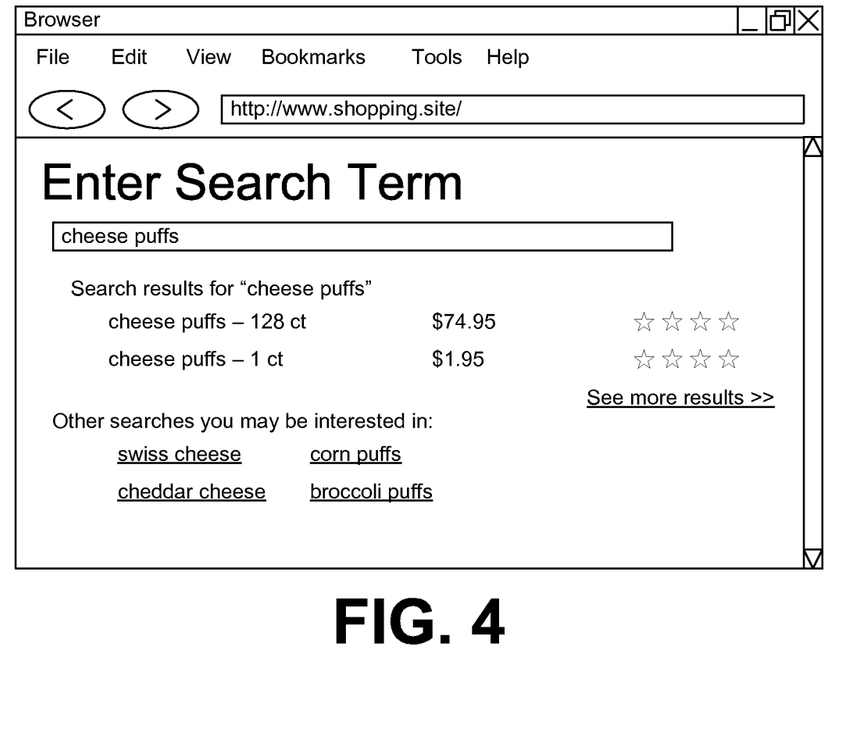
FIG. 4 is a drawing of a user interface generated by the computing device of FIG. 1 according to an embodiment of the present disclosure.

FIG. 4 depicts an alternative example of a user interface that can be facilitated by the search application 111. In the example of FIG. 4, the user supplied search query is associated with product search results in an electronic commerce system. The search application 111 can be employed to identify historical search queries 113 that are similar and/or relevant to the user supplied search query as described above. In the depicted example, the search application 111 can facilitate generation of a user interface that includes hyperlinks to historical search queries 113 that are similar and/or relevant to the user supplied search query. Additionally, the search application 111 can determine from a user session whether the user follows a hyperlink that is displayed and create a query association 117 between the user supplied search query and the historical query 113 associated with the hyperlink, which can facilitate display of higher quality historical search queries 113 for other users. The search application 111 can also track other attributes of a user session in this regard as described above.

Figure 5:
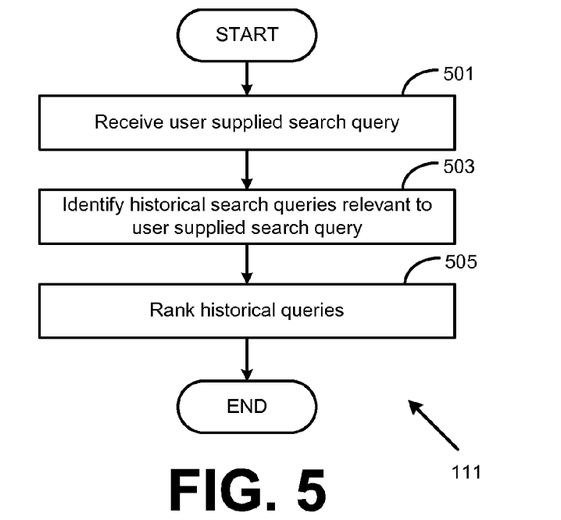
FIG. 5 is a drawing of a flowchart that illustrates one example of the operation of a search application executed in the computing device depicted in FIG. 1 according to an embodiment of the present disclosure.

Referring next to FIG. 5, shown is a flowchart that provides one example of the operation of a portion of the search application 111 according to various embodiments. It is understood that the flowchart of FIG. 5 provides merely an example of the many different types of functional arrangements that may be employed to implement the operation of the portion of the search application 111 as described herein. As an alternative, the flowchart of FIG. 5 may be viewed as depicting an example of steps of a method implemented in the computing device 103 (FIG. 1) according to one or more embodiments.

Beginning with box 501, the search application 111 receives a user supplied search query having at least one search term. In box 503, the search application 111 identifies at least one historical search query that is similar and/or relevant to the user supplied search query, and in box 505, the search application 111 ranks the identified historical search queries according to various factors and/or metrics that yield search results that are relevant and/or similar to the user supplied search query. As described above, the search application 111 can determine relevance and/or similarity by executing a textual similarity function to identify historical queries 113 that have the most textual similarity to the user supplied search query.

As one example, the search application 111 can also remove a search term from the user supplied search query and determine whether a historical search query 113 is associated with the resultant search query. The search application 111 can also determine a phrase level edit distance of historical search queries 113 from the user supplied search query, or any other textual similarity function described above. The search application 111 can rank search results according to various factors and/or metrics as described above. The search application 111 can identify a marketplace or other filter applied to the user supplied search, and rank historical search queries 113 performed in associated with the same filter higher than those that are not. The search application 111 can also rank the historical search queries 113 identified as relevant and/or similar to the search query according to other metrics and/or factors, including, but not limited to, popularity, conversion rate, click-through rate, and other factors as described above. Additionally, the historical search queries 113 can be ranked based on a combination of various factors, where each factor can be weighted to generate such a ranking.

Figure 6:
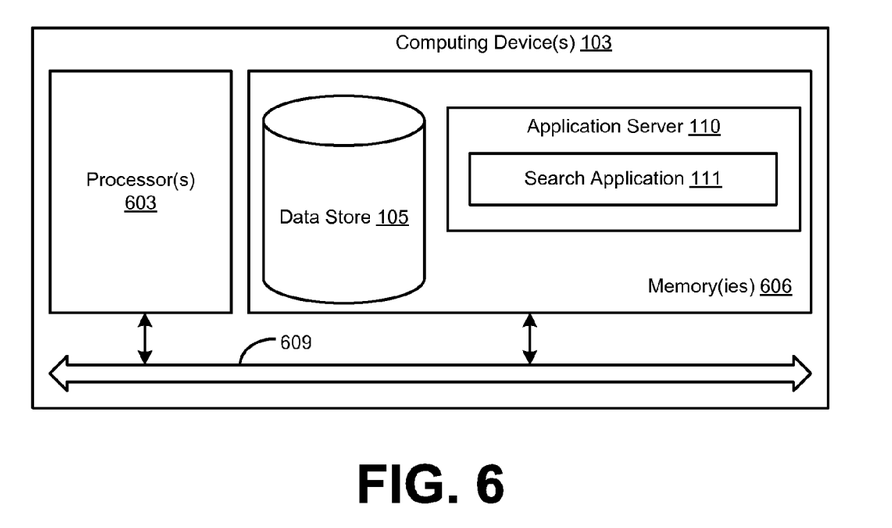
FIG. 6 is a drawing of one example of the computing device of FIG. 1 according to an embodiment of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the application server 110, search application 111, and potentially other applications. Also stored in the memory 606 may be a data store 105 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the search application 111 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the search application 111. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search application 111, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that receives a user supplied search query, the user supplied search query comprising a plurality of search terms;
    code that removes at least one of the search terms from the user supplied search query to generate a plurality of resultant search queries;
    code that determines whether individual ones of the resultant search queries comprise same search terms as a respective historical search query in a data store accessible to the computing device that is associated with at least one search result in the data store;
    code that identifies a plurality of search results associated with individual ones of the plurality of resultant search queries;
    code that determines whether individual ones of the plurality of search results match the at least one search result in the data store associated with the respective historical search query;
    code that identifies the respective historical search query as being relevant to the user supplied search query by executing at least one relevance function and at least one similarity function against an index of the respective historical search queries with the user supplied search query, wherein the at least one relevance function comprises a phrase level edit distance comparison of the user supplied search query to the respective historical search query and the at least one similarity function is a cosine similarity, jaccad similarity, or a dice similarity;
    code that generates a ranking of the respective historical search queries according to a number of the at least one search result in the data store associated with the respective historical search query that match individual ones of the plurality of search results, wherein a first respective historical search query associated with a higher number of the at least one search result in the data store associated with the respective historical search query that match individual ones of the plurality of search results is ranked higher than a second respective historical search query associated with a lower number of the at least one search result in the data store associated with the respective historical search query that match individual ones of the plurality of search results; and code that generates a user interface displaying the respective historical search queries in an order according to the ranking.

2. The non-transitory computer-readable medium of claim 1, wherein the code that generates the user interface displaying the respective historical search queries further comprises code that generates a hyperlink associated with individual ones of the respective historical search queries.

3. A system, comprising:
 at least one of one or more computing devices; and
 a search application executable via at least one of the one or more computing devices, the search application comprising:
  logic that determines whether a search query is associated with at least one product in a product catalog, the search query comprising a plurality of search terms;
  logic that removes a search term among the plurality of search terms from the search query to generate a plurality of resultant search queries;
  logic that identifies a plurality of search results associated with the plurality of resultant search queries;
  logic that determines whether individual ones of the resultant search queries match at least one respective historical search query in a data store that is associated with a plurality of historical search results in the data store;
  logic that determines whether individual ones of the plurality of search results match individual ones of the plurality of historical search results;
  logic that identifies the at least one respective historical search query that is relevant to the search query by generating a ranking of the at least one historical search query according to a number of individual ones of the plurality of historical search results that match individual ones of the plurality of search results, wherein a first historical search query associated with a higher number of individual ones of the plurality of historical search results that match individual ones of the plurality of search results is ranked higher than a second historical search query associated with a lower number of individual ones of the plurality of historical search results that match individual ones of the plurality of search results, and executing at least one relevance function and at least one similarity function against an index of the at least one historical search query with the search query, wherein the at least one relevance function comprises a phrase level edit distance comparison of the search query and the at least one respective historical search query and the at least one similarity function is a cosine similarity, jaccad similarity, or a dice similarity; and
  logic that generates a user interface comprising at least one search result associated with the at least one respective historical search query according to the ranking.

4. The system of claim 3, wherein the logic that identifies the at least one respective historical search query that is relevant to the search query further comprises:
 logic that identifies a subset of the historical search queries submitted by users over a predetermined period of time; and
 logic that indexes the subset of the historical search queries in the index.

5. The system of claim 3, wherein the logic that identifies the at least one respective historical search query that is relevant to the search query further comprises:
 logic that generates the ranking of the at least one respective historical search query according to a number of products with which the at least one respective historical search query is associated.

6. The system of claim 5, wherein the logic that generates the user interface comprising the at least one search result associated with the at least one respective historical search query further comprises logic that encodes for display the at least one respective historical search query in an order according to the ranking.

7. The system of claim 5, wherein the logic that generates the user interface comprising the at least one search result associated with the at least one respective historical search query further comprises:
 logic that encodes for display a subset of the at least one search result associated with the at least one respective historical search query in the user interface; and
 logic that encodes for display a historical search query hyperlink, the historical search query hyperlink linking to a search result user interface displaying the at least one search result associated with the at least one hyperlink.

8. The system of claim 3, wherein the logic that identifies the at least one respective historical search query that is relevant to the search query further comprises:
 logic that generates the ranking of the at least one respective historical search query according to a conversion rate of the at least one respective historical search query, the conversion rate being a rate at which the at least one product associated with the at least one respective historical search query is purchased.

9. The system of claim 3, wherein the logic that identifies the at least one respective historical search query that is relevant to the search query further comprises:
 logic that generates the ranking of the at least one respective historical search query according to a popularity of the at least one respective historical search query.

10. The system of claim 9, wherein the search application further comprises logic that increases a popularity metric associated with the popularity of the at least one respective historical search query when a user selects a hyperlink associated with the at least one respective historical search query and a search result associated with the at least one respective historical search query.

11. The system of claim 3, wherein the logic that identifies the at least one respective historical search query that is relevant to the search query further comprises:
 logic that associates at least one of a marketplace and a product category with the at least one respective historical search query; and
 logic that designates the at least one respective historical search query as relevant to the search query when the search query is performed in at least one of the marketplace and the product category.

12. The system of claim 3, wherein the search application further comprises logic that assigns a weight to the at least one search term; and the logic that identifies the at least one respective historical search query that is relevant to the search query further comprises logic that generates the ranking of the at least one respective historical search query according to a number of highest weighted at least one search term that is in the at least one respective historical search query.

13. The system of claim 12, wherein the logic that assigns a weight to the at least one search term further comprises logic that assigns a higher weight to a first search term in the search query when the first search term is associated with a fewer number of products in the product catalog relative to a second search term in the search query, wherein the fewer number of products is at least one.

14. The system of claim 12, wherein the logic that assigns a weight to the at least one search term further comprises logic that assigns a higher weight to a first search term in the search query when the first search term is associated with a fewer number of historical search queries relative to a second search term in the search query.

15. A method, comprising:
receiving, via at least one of one or more computing devices, a user supplied search query, the user supplied search query comprising a plurality of search terms;
removing, via at least one of the one or more computing devices, at least one of the search terms from the user supplied search query to generate a plurality of resultant search queries;
determining, via at least one of the one or more computing devices, whether individual ones of the resultant search queries one of a plurality of respective historical search queries in a data store accessible to the computing device that is associated with at least one search result in the data store;
identifying, via at least one of the one or more computing devices, a plurality of search results associated with the plurality of resultant search queries;
determining, via at least one of the one or more computing devices, whether the at least one search result is the same as individual ones of the plurality of search results;
identifying, via at least one of the one or more computing devices, the plurality of respective historical search queries as being relevant to the user supplied search query by executing at least one relevance function and at least one similarity function against an index of the plurality of respective historical search queries with the user supplied search query, wherein the at least one relevance function comprises a phrase level edit distance comparison of the user supplied search query and at least one of the plurality of respective historical search queries and the at least one similarity function is a cosine similarity, jaccad similarity, or a dice similarity; and
generating, via at least one of the one or more computing devices, a ranking of the respective historical search queries according to a number of the at least one search results that match individual ones of the plurality of search results, wherein a first historical search query associated with a higher number of the at least one search results that are the same as individual ones of the plurality of search results is ranked higher than a second historical search query associated with a lower number of that least one search results that match individual ones of the plurality of search results.

16. The method of claim 15, further comprising generating, via the at least one of the one or more computing devices, a user interface comprising at least one of the plurality of respective historical search queries.

17. The method of claim 16, wherein generating the user interface comprising at least one of the plurality of respective historical search queries further comprises generating a hyperlink associated with individual ones of the at least one of the plurality of respective historical search queries.

18. The method of claim 17, further comprising generating a query association when a user follows a hyperlink associated with a historical search query, the query association designating that the historical search query is relevant to the search query.

19. The method of claim 15, further comprising assigning, via the at least one of the one or more computing devices, a weight to individual ones of the plurality of search terms by:
determining, via the at least one of the one or more computing devices, whether a respective one of the plurality of search terms are associated with the at least one of the respective historical search queries;
identifying, via the at least one of the one or more computing devices, a number of search results associated with individual ones of the at least one of the respective historical search queries; and
weighting the respective one of the plurality of search terms according to a number of search results associated with the at least one of the respective historical search queries associated with the respective one of the plurality of search terms.

20. The method of claim 19, wherein weighting the respective one of the plurality of search terms according to the number of search results associated with the at least one of the respective historical search queries associated with the respective one of the plurality of search terms further comprises assigning, via the at least one of the one or more computing devices, a higher weight to the respective one of the plurality of search terms that is associated with a respective historical search query that is associated with a fewest number of search results greater than zero.

21. The method of claim 19, wherein generating the ranking of the respective historical search queries further comprises assigning, via the at least one of the one or more computing devices, a higher rank to a first historical search query comprising higher weighted search terms than a second historical search query.

22. The method of claim 15, further comprising assigning, via the at least one of the one or more computing devices, a weight to individual ones of the plurality of search terms by:
identifying, via the at least one of the one or more computing devices, a number of historical search queries associated with a respective one of the plurality of search terms; and
weighting the respective one of the plurality of search terms according to a number of historical search queries associated with the respective one of the plurality of search terms, wherein a higher weight is assigned to a search term that is associated with a fewest number of historical search queries.

* * * * *